(12) United States Patent
Smith

(10) Patent No.: US 8,988,225 B2
(45) Date of Patent: Mar. 24, 2015

(54) DOOR/WINDOW CONTACT SYSTEM

(71) Applicant: Honeywell International Inc., Morriwtown, NJ (US)

(72) Inventor: Richard Alan Smith, El Dorado Hills, CA (US)

(73) Assignee: Honeywell International, Inc., Morristown, NJ (US)

( * ) Notice: Subject to any disclaimer, the term of this patent is extended or adjusted under 35 U.S.C. 154(b) by 85 days.

(21) Appl. No.: 13/693,903

(22) Filed: Dec. 4, 2012

(65) Prior Publication Data

US 2014/0152438 A1   Jun. 5, 2014

(51) Int. Cl.
| | |
|---|---|
| *G08B 13/14* | (2006.01) |
| *G08B 13/08* | (2006.01) |
| *G08B 23/00* | (2006.01) |
| *G08B 25/10* | (2006.01) |
| *G08B 29/04* | (2006.01) |

(52) U.S. Cl.
CPC ............... *G08B 23/00* (2013.01); *G08B 13/08* (2013.01); *G08B 25/10* (2013.01); *G08B 29/046* (2013.01)
USPC .................................... 340/572.4; 340/572.1

(58) Field of Classification Search
CPC .............................. G08B 13/08; G08B 13/14
USPC .......... 340/572.1, 572.4, 568.1, 545.1, 545.7, 340/5.64, 10.1, 541
See application file for complete search history.

(56) References Cited

U.S. PATENT DOCUMENTS

| | | | |
|---|---|---|---|
| 7,800,497 B2 * | 9/2010 | Marusak et al. ............ 340/545.1 |
| 7,986,235 B2 * | 7/2011 | Posamentier ............... 340/572.1 |
| RE43,178 E  * | 2/2012 | Ghazarian .................. 340/568.1 |
| 8,482,413 B2 * | 7/2013 | Martin ........................ 340/572.1 |
| 2010/0135187 A1 * | 6/2010 | Kwark .......................... 370/254 |
| 2010/0225482 A1 * | 9/2010 | Kasai et al. ................. 340/572.1 |
| 2011/0043362 A1 * | 2/2011 | Reibel ........................... 340/541 |
| 2013/0049929 A1 * | 2/2013 | Gerlach ....................... 340/5.64 |

* cited by examiner

*Primary Examiner* — Van T. Trieu
(74) *Attorney, Agent, or Firm* — Husch Blackwell LLP

(57) ABSTRACT

A window or door position detector includes an RFID tag attachable to the window or door, and a transceiver. The transceiver emits an activating signal to the tag. The tag in turn responds with an identifying RF signal indicative of a predetermined position of the window or door. The detector includes a transceiver which can communicate with both the tag and a displaced monitoring system control panel.

14 Claims, 3 Drawing Sheets

DOOR/WINDOW CONTACT SYSTEM

FIELD

The application pertains to location or position detectors. More particularly, the application pertains to such detectors which can be used to detect a change of position of a window or door.

BACKGROUND

Known door and window contacts utilized in intrusion detection systems are typically based on reed and magnet technology. This technology, although inexpensive to implement, has limitations. The two major ones are gap limitations and security vulnerability.

"Wide-gap" reed switch contacts have had their maximum functional gaps stretched to reliable limits through various methods. However, mounting on surfaces constructed of ferrous materials results in a magnetic flux field interference that further reduces the maximum operating gap.

Most reed based contacts are also defeated by the use of a magnet introduced in close proximity to the reed by the intruder. There are numerous improved implementations that reduce this security vulnerability, but with additional cost. The challenge is to significantly overcome these issues without increasing the cost of the end product.

DETAILED DESCRIPTION

Figure 1A:
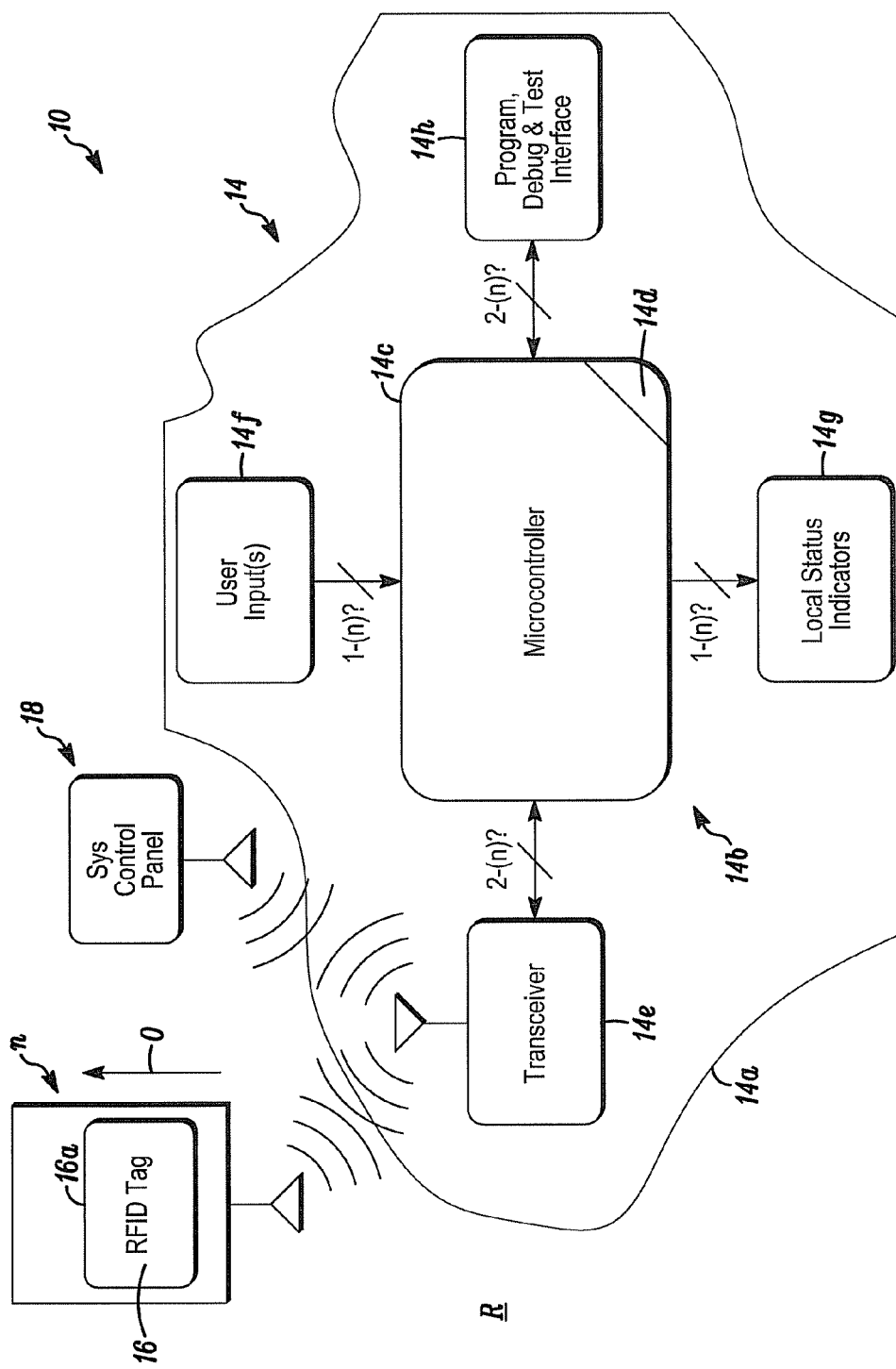
FIG. 1A is a block diagram of a system in accordance herewith.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

Embodiments hereof address the common issues of gap and security limitations (and robustness) that are typically encountered with reed switch type door and window contacts, particularly wireless versions. A method and system in accordance herewith utilize RFID-type tags. In embodiments hereof, the reed switch and magnet are replaced with, preferably, a passive RFID tag. The "tag" module includes a housing that can be mounted in the same type of locations that the magnet typically would be. The housings can be configured to be used in both surface mount and recessed mount applications. Advantageously, for wireless installations, the detectors will include a transmitter and receiver, or transceiver, to communicate with a control panel. That transceiver would also be used for the interrogation of the RFID tag and for reading its response.

Passive RFID tags can be read by a transceiver at a distance of more than an order of magnitude greater than the greatest spaced apart distance of reed switch/magnet combos. Since this extent of range is not needed for a security contact the transmit power for interrogation can be optimized for battery operation. Standard RFID tags can be used by operating the RF transceiver at common frequencies. Alternately, customized RFID tags can be used, without limitation.

In one aspect, embodiments hereof utilize a standard wireless transceiver designed for security system devices. Such transceivers can not only communicate with the alarm system, but can also interrogate and read the response of either a custom or standard passive RFID tag ("tag") to determine if it is present and within a predetermined distance ("gap"), using common transceiver circuitry. In yet another aspect, a custom tag and protocol could be used.

A standard off the shelf RFID tag and protocol can be used for optimizing power for battery operation. Some of the known wireless security devices have historically operated with a carrier frequency of 345 MHz (in the US), and more recently in the UHF ISM band (~900 MHz). Passive RFID tags have utilized these frequencies. It is thus feasible to use the communication carrier frequency to interrogate a tag and read the response utilizing common communications circuitry, adding no additional cost to the sensing system of the detector. Exemplary operable frequencies can be selected from a band extending between 300 Megahertz to 930 Megahertz.

Power required can be optimized to improve battery life by only sending what the tag requires for a "read" to successfully occur. Power could be auto-adjusted so that during the normal state of the door/window being in the closed position, the power would be minimized.

In yet another aspect, a particular advantage of a custom tag system is that the standard RFID protocols could be avoided by establishing a proprietary protocol, offering additional advantages in power savings and security. An additional method to reduce power is to self-adjust power accordingly. When the gap increases the receiver eventually will not be able to see the tag's response and at the subsequent interrogation pulse(s) the power would be increased to determine if the tag is still within the user programmed, or predefined range ("gap"). This methodology allows the power to be continuously optimized for the current gap so that no more power is used than what is absolutely necessary.

Typical tags can be interrogated and read in under 4 mS. 2 mS with selected protocols is feasible. This time could additionally be reduced through use of a custom tag. The duty cycle and pulse width of integration transmission could be optimized for further power reduction.

Figure 1B:
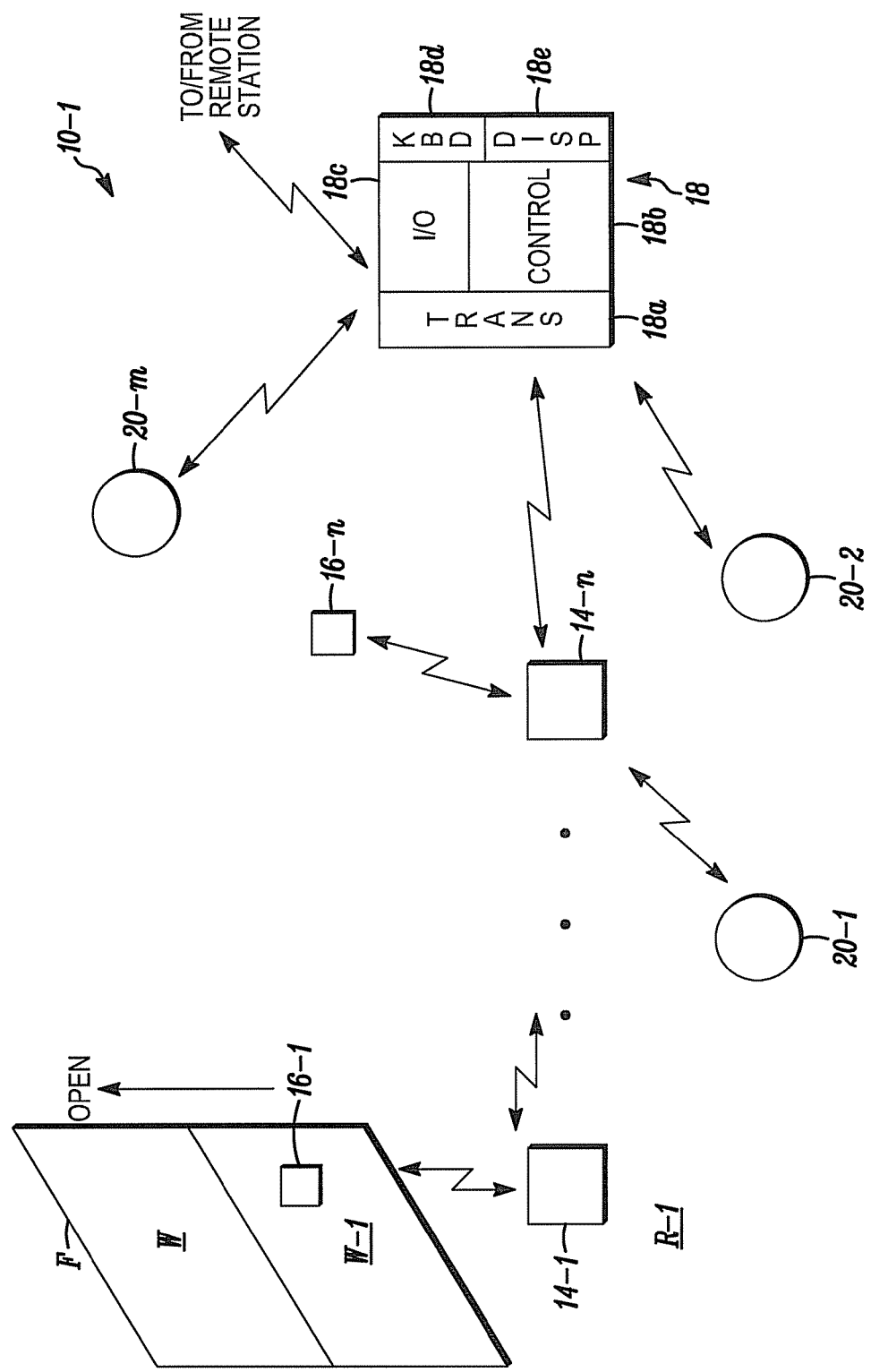
FIG. 1B is a block diagram of the system of FIG. 1A with additional details.

FIGS. 1A, 1B illustrate aspects of systems 10, 10-1 in accordance herewith, which can monitor a region R, R-1, and sense the presence of various alarm conditions. Conditions include intrusion, fire, or gas in the region R, R-1.

FIG. 1A illustrates a position detector 14 which communicates with an RFID tag 16 to sense when a movable member M has moved, in a direction O from one position to another. Member M could be, for example a door or a window, in the region R, whose position needed to be monitored.

Detector 14 is in wireless, RF, communication with the tag 16 as well as a monitoring system control unit, or panel, 18 as will be discussed subsequently. Detector 14 includes a housing 14a which carries control circuitry, generally indicated at 14b, which could be implemented, at least in part, with a programmable processor 14c and associated executable control software 14d.

Detector 14 can also include a transceiver 14e, coupled to control circuits 14b, which can communicate both with tag 16 and control panel 18. The transceiver 14e can be used to activate tag 16, as would be understood by those of skill in the art. Tag 16, when activated, can transmit an identifier to transceiver 14e at the same or similar frequency as the activating signal, from the transceiver 14e.

The return signal from tag 16 is indicative of the member M being at an acceptable position. If transceiver 14e fails to receive a return signal, from tag 16, an alarm condition is indicated. Either the tag has been removed, or it has been displaced from its normal position, to a second different position, due to movement O of the object M. Control circuits 14b can cause the transceiver 14e to transmit an alarm indicting signal to the system control panel 18 at or about the same frequency as the activating signal transmitted to the tag 16. Thus transceiver 14e carries out multiple communications functions thereby reducing over-all cost of the detector 14.

Local user inputs can be provided by interface 14f. Local visual, or audible status indicators 14g can also be carried by housing 14a and coupled to control circuits 14b. A test, programming and diagnostic interface 14h, coupled to control circuits 14b can also be carried by housing 14a.

Tag 16 can be carried by a housing 16a. Housing 16a can be attached to the movable object M being monitored by adhesive, or fasteners with a surface mount or a recessed mounting feature.

FIG. 1B illustrates a system 10-1 which monitors a region R-1. System 10-1 includes a plurality of position detectors 14-1 . . . -n corresponding in structure and operation to previously discussed detector 14. Respective RFID tags 16-1 . . . -n are mounted on objects, such as window W with a movable portion W-1 which is being monitored. The respective detector/tag pairs 14-i/16-I interact as discussed above with respect to detector/tag pair 14/16.

Detectors 14-i communicate wirelessly with monitoring control unit 18 and transceiver 18a. Control unit 18 also includes control circuitry 18b, input/output circuitry 18c, an input device, such as a keyboard 18d, and an output device, or display 18e. System 10-1 can also include a plurality of ambient condition detectors such as 20-I all of which can be in wireless communication with control panel 18. Detectors 20-I can include glass break detectors, motion detectors, fire detectors, gas detectors and the like all without limitation. In system 10-1 each of the detectors 14-i includes a common transceiver, such as 14e which communicates both with the respective tag, such as 16-i, and the control panel 18, via transceiver 18a.

Figure 2:
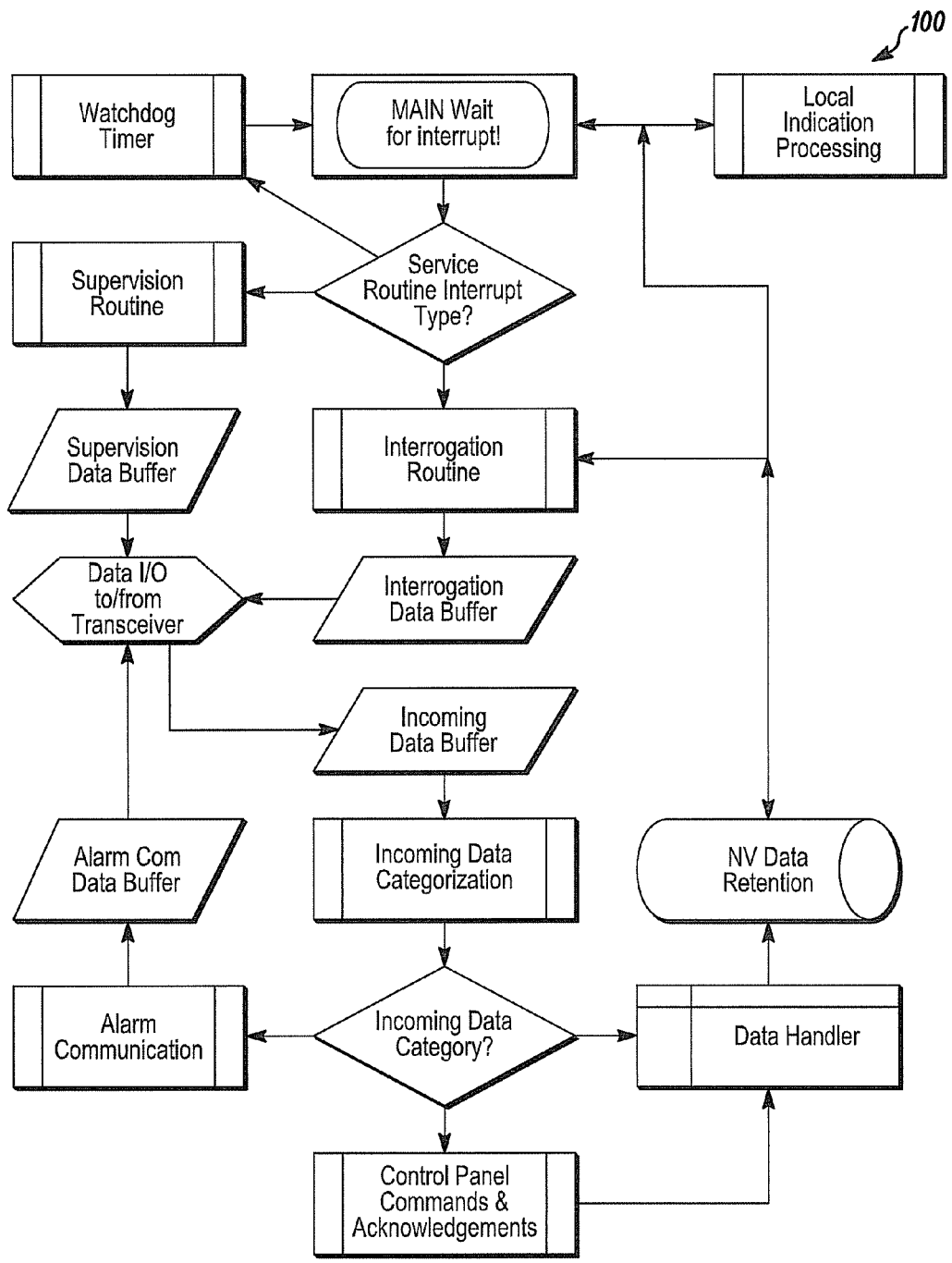
FIG. 2 is a flow diagram of a method in accordance herewith.

FIG. 2 illustrates an exemplary flow diagram of a process 100 of operating one of the position detectors, such as 14-i.

In summary, bi-directional wireless security system position detectors each include a transceiver which would not only be able to interrogate and read an RFID tag on a movable member, but would also communicate, or report, to a system control unit or panel. With the circuitry being shared the cost of implementation would be low. In a wireless security contact, which is bi-directional in its communication to the host panel, the reed and magnet cost would be replaced by the cost of the passive tag to implement a position detector as described above. Investigation has shown that passive tags can cost under $1, which makes it feasible to implement the invention from a cost standpoint, as both the reed and magnet are replaced. Passive UHF ISM band tags are amongst the lowest in cost, with prices below $0.20. With this cost below the cost of the reed and magnet of traditional systems there should be no additional cost.

As noted above, typical reed switch based contacts can be effectively defeated by a semi-skilled intruder though use of a magnet. Although there are some higher security versions which address this issue they are also more expensive.

The above disclosed detector has a higher threshold of defeat as it would require a sophisticated active device. Since RFIDs tags inherently have a unique identification number they require a RFID reader to be able to read the tag ID. Tags can, and often do, implement security features so that they will only communicate their unique ID to a reader that is recognized to be valid (read password). A passive attempt at defeat with another tag could be attempted, but is easily dealt with at the reader. With various options for security features an RFID tag used as a security contact, as described above has very significant security advantages.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A position detector comprising:
   a first element having an attachment feature, the first element emitting a unique, identifying radio frequency signal in response to a received, enabling radio frequency signal wherein the first element further comprises a standard off the shelf RFID tag and protocol; and
   a second element with a transmitter that emits the enabling radio frequency signal, and that emits a reporting radio frequency signal, wherein both signals are emitted by the same transmitter at the same frequency.

2. A detector as in claim 1 where the first element includes an RFID-type tag which transmits the identifying radio frequency signal upon receipt of the enabling radio frequency signal.

3. A detector as in claim 2 where the tag is one of an active tag, or a passive tag.

4. A detector as in claim 1 where the attachment feature of the first element includes at least one of an adhesive, or a mechanical fastener.

5. A detector as in claim 4 where the first element includes a housing which carries the attachment feature.

6. A detector as in claim 1 wherein a housing of the first element is one of surface mountable, or recess mountable.

7. An apparatus which includes at least one wireless position detector as in claim 1 and which includes a monitoring system control unit with a receiver which receives the reporting signal, and, emits an alarm indicating output indicative of the reporting signal.

8. An apparatus as in claim 7 where the transmitter wirelessly communicates with the monitoring system control unit with a signal having a frequency substantially identical to the frequency of the enabling signal emitted by the detector.

9. An apparatus as in claim 7 where the position detector includes a common transmitter to emit an activating signal and a reporting signal.

10. A monitoring system comprising:
    a plurality of wireless condition detectors wherein at least one detector responds to displacement of a member from a first position to a second displaced position, and includes a transceiver which emits both a wireless activation signal to an RF responsive position sensor, and a wireless alarm reporting signal where the wireless activation signal and wireless alarm reporting signal are transmitted at the same frequency and where the RF responsive position sensor further comprises a standard off the shelf RFID tag and protocol; and a control unit in wireless communication with members of the plurality wherein the unit includes a receiver which receives the reporting signal.

11. A monitoring system as in claim 10 where the transceiver of the at least one detector emits an enabling radio frequency signal, and the detector's reporting signal, wherein both signals are emitted at substantially the same frequency.

12. A monitoring system as in claim 10 which includes in the plurality at least one or more of, glass break detectors, motion detectors, fire detectors, and gas detectors.

13. A monitoring system as in claim 10 where the at least one detector includes an RFID-type tag mountable on the one member.

14. A monitoring system as in claim 10 where the at least one detector transmits at a frequency in a band between 300 MHz and 930 MHz.

\* \* \* \* \*